Feb. 27, 1934.  E. H. FITTER  1,949,300
MIXING FAUCET
Filed July 10, 1931
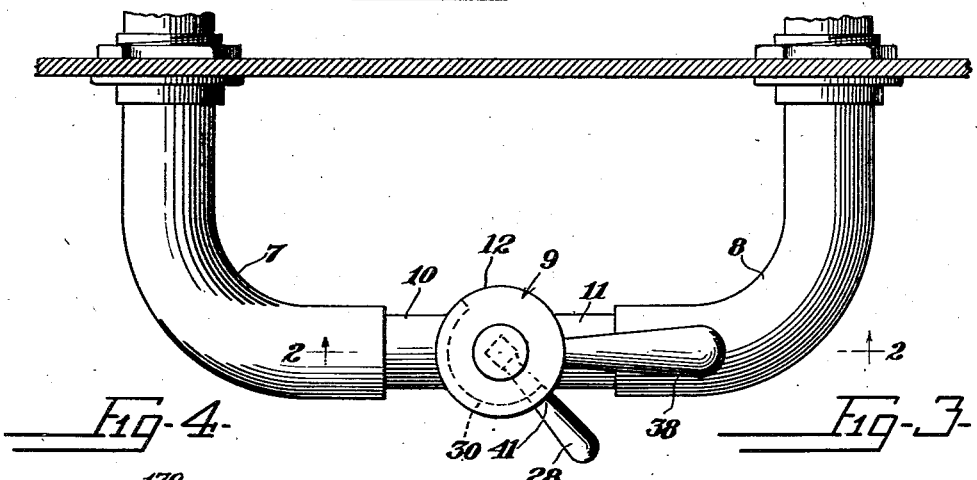
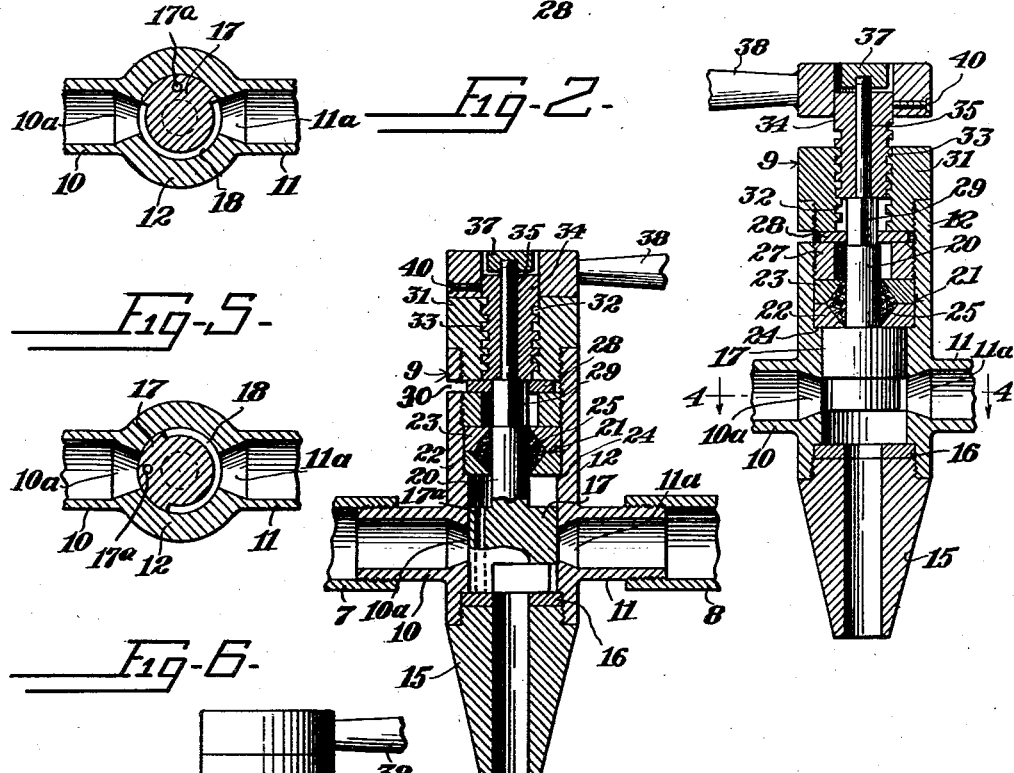
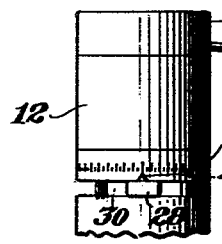
Emil H. Fitter
INVENTOR
BY Victor J. Evans
ATTORNEY
WITNESS:

Patented Feb. 27, 1934

1,949,300

UNITED STATES PATENT OFFICE 1,949,300

MIXING FAUCET

Emil H. Fitter, New York, N. Y.

Application July 10, 1931. Serial No. 549,997

2 Claims. (Cl. 251—4)

This invention relates to a mixing faucet by means of which two liquids may be discharged through a common nozzle in any desired proportion or either one alone.

An object of the invention is the provision of a mixing faucet comprising a casing having inlets and an outlet, a valve plug or member within the casing, means for turning the valve member to variously proportion the fluid flowing through the inlets and means for raising and lowering the valve member to regulate the rate of flow of the total volume of fluid flowing through the inlets.

Other objects of the invention will be appreciated from a reading of the following specification.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therefrom as do not affect the spirit of the invention nor exceed the scope thereof as expressed in the appended claims.

In the drawing:

Fig. 1 is a plan view of my improved mixing faucet shown connected to a pair of pipes.

Fig. 2 is a vertical section taken on line 2—2 of Fig. 1, looking in the direction of the arrows, this view showing the faucet closed.

Fig. 3 is a view similar to Fig. 2 showing the faucet opened to allow fluid to flow from both pipes associated with the faucet through the nozzle of the latter.

Fig. 4 is a horizontal section taken on line 4—4 of Fig. 3.

Fig. 5 is a view similar to Fig. 4 showing one of the inlets of the faucet as being entirely shut off and the other completely opened; and Fig. 6 is a fragmentary front elevation of the faucet showing indicating means.

Referring to the drawing for a more detailed description thereof, the numerals 7 and 8 indicate a pair of pipes connected to a mixing faucet 9 constructed as one embodiment of my invention. The pipes 7 and 8, which may respectively carry hot and cold water, for example, or may carry other fluids, are respectively connected to nipples 10 and 11, which extend laterally from the casing 12 of the faucet in alignment with each other. The lower end of the casing 12 is provided with a nozzle 15 threadedly engaging the casing 12 and holding in position a washer 16. A valve plug or member 17, having a vertical drainage aperture 17a, is disposed in the casing 12 between the nipples 10 and 11 and is cut away peripherally, as indicated by the numeral 18, to the extent indicated in Figs. 4 and 5, so that water or other liquid may flow through the inlets 10a and 11a of the casing to the full extent allowed by said inlets, when the valve is sufficiently raised by mechanism hereinafter described. The valve plug or member 17 is provided with a stem 20 extending vertically upward, the mentioned stem being provided with a stuffing box 21 consisting of cooperating plates 22 and 23, the latter being seated on a shoulder 24 formed on the inner surface of the casing 12. The mentioned plates 22 and 23 hold packing 25 around the stem 20 of the valve member or plug. The upper plate 23 of the stuffing box is pressed down on the lower plate 22 of the same by means of a nut 27 threaded to the interior of the casing 12, and on the upper surface of the nut 27 a lever 28 is disposed, said lever being mounted on and adapted to turn the mentioned stem, the mentioned lever being mounted on the square portion 29 of the stem and passing through a horizontal slot 30 formed in the casing 12. A cap 31 is threaded to the interior of the casing 12 and is interiorly threaded so as to provide left-hand threads 32 which are engaged by left-handed threads 33 formed exteriorly on a member 34 having a vertical aperture therethrough for the passing of the upper end portion 35 of the mentioned stem.

A nut 37 is screwed onto the upper end of the upper portion 35 of the stem. A lever 38 rests on the upper surface of the cap 31 and is secured by means of a screw 40 to the threaded member 34.

Turning the lever 38 is effective to raise and lower the valve plug or member 17, according to the direction in which the lever is turned, the valve plug 17 being adapted to be seated on the washer 16 when in completely closed position and being adapted to regulate the rate of flow of the total volume of fluid flowing through the inlets 10a and 11a and through the nozzle 15. In order to variously proportion the fluid flowing through the mentioned inlets so as to obtain any desired mixture, the lever 28 is turned to the correct position. A pointer 41 extends from the lever 28 adjacent a scale 42 to indicate the position of the lever 28 necessary to obtain any desired mixture of fluids flowing through the inlets 10a and 11a.

What is claimed as new is:

1. A mixing faucet comprising a casing having a duality of inlets disposed respectively on diametrically opposite sides and a pendent outlet, a valve plug mounted in the casing for both angular and axial movement and cut away at the under edge and on the periphery for a part of the extent of the latter, a cap closing the casing and positioned axially of the outlet, a cylindrical member threadingly engaged with the cap, the plug having a stem of which a part is cylindrical and extends slidingly through said cylindrical member, a part of the stem between the cylindrical portion and the plug being formed with an angular cross-section, means for locking the stem to the cylindrical member to preclude relative axial movement of the two, means for imparting angular or turning movement to the cylindrical member, and a lever extending through a lateral slot in the casing and having an inner end slidably engageable with the angular portion of the stem.

2. A mixing faucet comprising a casing having a duality of inlets disposed respectively on diametrically opposite sides and a pendent outlet, a valve plug mounted in the casing for both angular and axial movement and cut away at the under edge and on the periphery for a part of the extent of the latter, a cap closing the casing and positioned axially of the outlet, a cylindrical member threadingly engaged with the cap, the plug having a stem of which a part is cylindrical and extends slidingly through said cylindrical member, a part of the stem between the cylindrical portion and the plug being formed with an angular cross-section, means for locking the stem to the cylindrical member to preclude relative axial movement of the two, means for imparting angular or turning movement to the cylindrical member, and a lever extending through a lateral slot in the casing and having an inner end slidably engageable with the angular portion of the stem, the means for preventing relative axial movement of the stem and cylindrical member consisting of a shoulder formed by the angular cross-sectional portion of the stem and a nut engaged with the cylindrical portion of the stem and disposed above the cylindrical member.

EMIL H. FITTER.